(12) United States Patent
Sandu et al.

(10) Patent No.: US 11,718,249 B2
(45) Date of Patent: Aug. 8, 2023

(54) MOBILE DEVICE TOOLS FOR SMART VEHICLE FEATURES OPERATION AND AUTOMATIC WIRELESS ROUTING SELECTION AND METHODS OF USE

(71) Applicant: Thor Tech, Inc., Elkhart, IN (US)

(72) Inventors: Ciprian R. Sandu, Coppell, TX (US); Jason T. Kriesel, Grand Prairie, TX (US); McKay R. Featherstone, Tipp City, OH (US); Edward Brady, Delaware, OH (US); Steven Hileman, Coldwater, OH (US)

(73) Assignee: Thor Tech, Inc., Elkhart, IN (US)

( * ) Notice: Subject to any disclaimer, the term of this patent is extended or adjusted under 35 U.S.C. 154(b) by 552 days.

(21) Appl. No.: 16/751,826

(22) Filed: Jan. 24, 2020

(65) Prior Publication Data

US 2020/0238928 A1 Jul. 30, 2020

Related U.S. Application Data

(60) Provisional application No. 62/796,690, filed on Jan. 25, 2019.

(51) Int. Cl.
*B60R 16/023* (2006.01)
*B60H 1/00* (2006.01)
(Continued)

(52) U.S. Cl.
CPC ..... *B60R 16/0231* (2013.01); *B60H 1/00828* (2013.01); *B60P 3/343* (2013.01);
(Continued)

(58) Field of Classification Search
CPC ........ G16Y 40/30; G16Y 20/10; G16Y 10/75; B60R 16/0231; B60R 25/01; B60R 25/24;
(Continued)

(56) References Cited

U.S. PATENT DOCUMENTS

| 2015/0234665 A1* | 8/2015 | Matsuyuki | ............. | B60K 37/06 |
| | | | | 701/36 |
| 2016/0197772 A1 | 7/2016 | Britt et al. | | |

(Continued)

FOREIGN PATENT DOCUMENTS

| CN | 207959744 U | * 10/2018 |
| KR | 10-1853478 B1 | * 4/2018 |

(Continued)

OTHER PUBLICATIONS

Machine Translation of Fang's reference (CN 207959744 U) (Year: 2018).*

(Continued)

*Primary Examiner* — Tarek Elarabi
(74) *Attorney, Agent, or Firm* — Dinsmore & Shohl LLP

(57) ABSTRACT

Control methods and systems including a smart vehicle, a smart mobile device including a processor, a memory communicatively coupled to the processor, and machine readable instructions stored in the memory that may cause a system to perform at least the following when executed by the processor: use the smart mobile device to automatically control functionality of smart features of the smart vehicle based on an applied control logic and environmental inputs and/or use the smart mobile device to automatically control a wireless routing selection between a local area network associated with the smart vehicle and a remote wide area network based on an application tool switch logic.

10 Claims, 7 Drawing Sheets

(51) Int. Cl.
  B60P 3/34   (2006.01)
  B60R 25/01  (2013.01)
  B60R 25/24  (2013.01)
  E04H 15/08  (2006.01)
  H04L 67/12  (2022.01)
  G16Y 20/10  (2020.01)
  G16Y 40/30  (2020.01)
  G16Y 10/75  (2020.01)
  H04L 12/28  (2006.01)

(52) U.S. Cl.
  CPC .............. B60R 25/01 (2013.01); B60R 25/24 (2013.01); E04H 15/08 (2013.01); H04L 67/12 (2013.01); G16Y 10/75 (2020.01); G16Y 20/10 (2020.01); G16Y 40/30 (2020.01); *H04L 12/28* (2013.01)

(58) Field of Classification Search
  CPC ..... B60H 1/00828; B60P 3/343; E04H 15/08; H04L 67/12; H04L 12/28
  See application file for complete search history.

(56) References Cited

U.S. PATENT DOCUMENTS

| | | |
|---|---|---|
| 2016/0297398 A1 | 10/2016 | Jefferies |
| 2017/0178035 A1 | 6/2017 | Grimm |
| 2017/0366969 A1 | 12/2017 | Syed |
| 2018/0108194 A1 | 4/2018 | Link, II |
| 2018/0154874 A1 | 6/2018 | Kulkarni et al. |
| 2018/0178781 A1* | 6/2018 | Funk .................... B60W 30/08 |
| 2018/0367329 A1 | 12/2018 | Shin |
| 2019/0020718 A1 | 1/2019 | Mathews et al. |

FOREIGN PATENT DOCUMENTS

| | | |
|---|---|---|
| KR | 101933493 B1 | 12/2018 |
| WO | 2017106224 A1 | 6/2017 |

OTHER PUBLICATIONS

Machine Translation of Hwan's reference (KR 10-1853478 B1) (Year: 2018).*

International Search Report and Written Opinion dated Jun. 23, 2020 pertaining to International application No. PCT/US2020/014970 filed Jan. 24, 2020, 22 pgs.

International Search Report and Written Opinion dated Apr. 9, 2020 pertaining to International application No. PCT/US2020/014944 filed Jan. 24, 2020, 17 pgs.

International Search Report and Written Opinion dated Apr. 9, 2020 relating to International Application No. PCT/US/2020/014880.

* cited by examiner

MOBILE DEVICE TOOLS FOR SMART VEHICLE FEATURES OPERATION AND AUTOMATIC WIRELESS ROUTING SELECTION AND METHODS OF USE

CROSS REFERENCE TO RELATED APPLICATIONS

This application claims the benefit of U.S. Provisional Application Ser. No. 62/796,690 (AIR 1006 MA), filed Jan. 25, 2019, the entire contents of which are incorporated by reference.

TECHNICAL FIELD

The present specification generally relates to systems to control a smart vehicle with wireless routing functionality and, more specifically, to systems to control functionality of smart features of the smart vehicle and automatic wireless routing selection with a smart mobile device paired with the smart vehicle and methods of use of such systems.

BACKGROUND

A smart mobile device paired with another device may access a network through a wide area connection or a local area connection. Type of access is typically manually selected such that a most optimized selection at a time is not provided. Such manual selection may lead to faulty connections and/or inefficient data and telephone usage.

Accordingly, a need exists for alternative systems for wireless routing selection of a smart mobile device paired with another device, efficient control of the another device through the smart mobile device, and methods of use of such systems.

BRIEF SUMMARY

In one embodiment, a control system comprises a smart vehicle, a smart mobile device, and a non-transitory computer readable storage. The smart vehicle comprises an Internet of Things (IoT) controller and one or more smart vehicle features communicatively coupled to the IoT controller. The smart mobile device comprises a software application tool, the software application tool including a user interface and comprising a processor. The software application tool is paired with the IoT controller. The non-transitory computer readable storage communicatively is coupled to the processor and comprises instructions that, when executed by the processor, cause the control system to: generate, by the IoT controller, environmental inputs with respect to the smart vehicle, and receive, by the software application tool, the environmental inputs with respect to the smart vehicle. The instructions further cause the control system to: apply control logic based on the environmental inputs and the one or more smart vehicle features, and control operation via the user interface of the software application tool of at least one smart vehicle feature of the one or more smart vehicle features based on the applied control logic and the environmental inputs.

In another embodiment, a control system comprises a smart vehicle, a smart mobile device, network interface hardware, and a non-transitory computer readable storage. The smart vehicle comprises an Internet of Things (IoT) controller and a router, the router comprising a first router identification configured to provide wifi access as a wireless local area network (LAN) connection and a second router identification communicatively coupled with the IoT controller. The smart mobile device comprises a software application tool that comprises a processor, and the software application tool is paired with the IoT controller. The network interface hardware is configured to facilitate communication between the smart mobile device and the smart vehicle over a network connection, the network connection comprising one of the wireless LAN connection and a wireless wide area network (WAN) connection at a first time. The non-transitory computer readable storage is communicatively coupled to the processor and comprises instructions that, when executed by the processor, cause the control system to: determine a LAN performance metric of the wireless LAN connection, determine a WAN performance metric of the wireless WAN connection, and compare the LAN performance metric and the WAN performance metric to determine which of the wireless LAN connection or the wireless WAN connection comprises an optimal network connection at a second time based on device control, diagnostics, monitoring, telemetry, or combinations thereof. The instructions further cause the control system to: apply application tool switch logic based on the optimal network connection to determine whether to switch the network connection at the second time to the optimal network connection, and automatically switch the network connection to the optimal network connection based on the application tool switch logic when the network connection is one of the wireless LAN connection and the wireless WAN connection and the optimal network connection is the other of the wireless LAN connection and the wireless WAN connection.

In yet another embodiment, a control system comprises a smart vehicle, a smart mobile device, network interface hardware, and a non-transitory computer readable storage. The smart vehicle comprises an Internet of Things (IoT) controller, a router, and one or more smart vehicle features communicatively coupled to the IoT controller. The router comprises a router identification card configured to provide wifi access as a wireless local area network (LAN) connection. The smart mobile device comprises a software application tool, the software application tool including a user interface and comprising a processor. The software application tool is paired with the IoT controller. The network interface hardware is configured to facilitate communication between the smart mobile device and the smart vehicle over a network connection, the network connection comprising one of the LAN connection and a wireless wide area network (WAN) connection. The non-transitory computer readable storage is communicatively coupled to the processor and comprises instructions that, when executed by the processor, cause the control system to: determine a LAN performance metric of the wireless LAN connection, determine a WAN performance metric of the wireless WAN connection, and compare the LAN performance metric and the WAN performance metric to determine which of the wireless LAN connection or the wireless WAN connection comprises an optimal network connection at a second time based on device control, diagnostics, monitoring, telemetry, or combinations thereof. The instructions further cause the control system to: apply application tool switch logic based on the optimal network connection to determine whether to switch the network connection at the second time to the optimal network connection, and automatically switch the network connection to the optimal network connection based on the application tool switch logic when the network connection is one of the wireless LAN connection and the wireless WAN connection and the optimal network connection is the other of the wireless LAN connection and the wireless WAN connection. The instructions also cause the control system to: receive, by the software application tool, environmental inputs with respect to the smart vehicle, apply control logic based on the environmental inputs and the one or more smart vehicle features, and control operation via the user interface of the software application tool of at least one of the one or more smart vehicle features based on the applied control logic, the environmental inputs, and the optimal network connection.

These and additional features provided by the embodiments described herein will be more fully understood in view of the following detailed description, in conjunction with the drawings.

BRIEF DESCRIPTION OF THE SEVERAL VIEWS OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
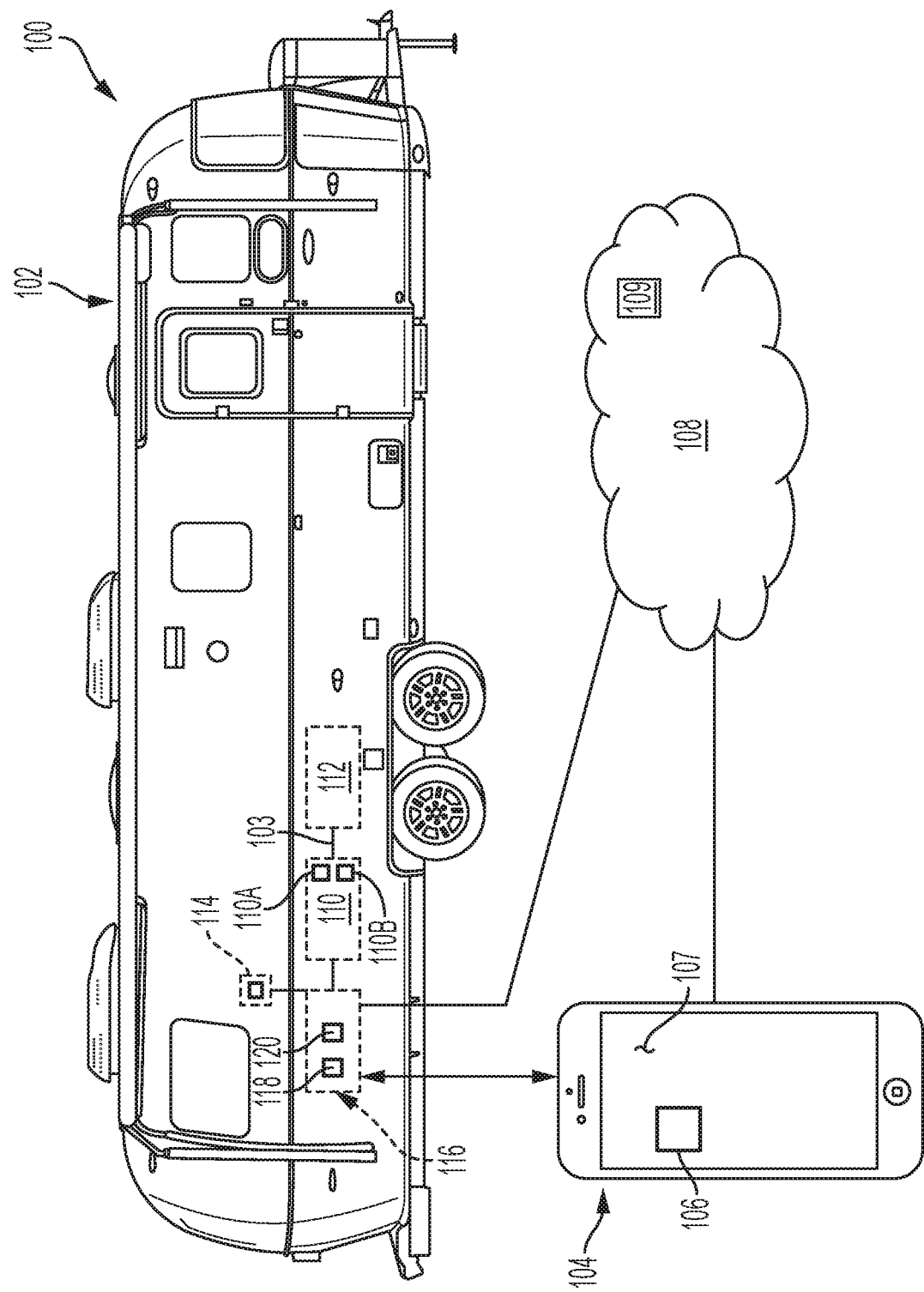
FIG. 1 schematically illustrates a system for implementing computer and software based methods to utilize a control system to control smart features operation of a smart vehicle through a paired smart mobile device and to automatically control wireless routing selection with the paired smart mobile device, according to one or more embodiments shown and described herein.

Referring generally to the figures, embodiments of the present disclosure are directed to systems and methods for controlling functionality of smart features of the smart vehicle and automatic wireless routing selection with a smart mobile device paired with the smart vehicle. As described herein, use of "smart" with respect to a device or item, such as a mobile device or vehicle or vehicle feature, is in reference to electronic devices or items that are configured to be in electronic communication with one or more other technologies through a wired or wireless communication link. By way of example, and not as a limitation, such a wired or wireless communication link may include a communication network as described herein, a communication path as described herein, conductors electronically connecting a pair of devices, and/or other conventional or yet-to-be developed technologies, or combinations thereof, as understood to those skilled in the art, to provide the communication link.

The control systems described herein streamline a process to control functionality of smart features of the smart vehicle and to control automatic wireless routing selection with a smart mobile device paired with the smart vehicle. Additionally, the systems described herein incorporate control to reduce an amount of processing time along with reducing a potential of human error, thereby increasing and improving processing speed and accuracy of the systems described herein.

Reference will now be made in detail to embodiments of the configuration systems, and examples of such systems are illustrated in the accompanying drawings. Wherever possible, the same reference numerals will be used throughout the drawings to refer to the same or like parts. Various embodiments of the configuration systems will be described in further detail herein with specific reference to the appended drawings.

Referring to FIG. 1, a control system 100 includes a smart vehicle 102. The smart vehicle 102 may be a recreational vehicle (RV), such as ones commercially available through AIRSTREAM, Inc. of Jackson Center, Ohio. Further, the control system 100 includes a router 116, one or more processors 110 communicatively coupled to the router 116, and a memory 112 communicatively coupled to the one or more processors 110. The router 116 may be configured for the smart vehicle 102 such that the router 116 is installed within and associated with the smart vehicle 102. The router 116 includes a first identification card 118 and a second identification card 120, as described in greater detail further below. Information from the router 116 is transmitted through the first identification card 118 and the second identification card 120 and uploaded to a router file in the network 108 (e.g., the cloud). Such information may include router information and information regarding the first identification card 118 and the second identification card 120, such as serial numbers and other identifying information. Such information stored in the cloud may be accessible by an application programming interface (API), as may be provided by the card services provider.

The control system 100 includes machine readable instructions stored in the memory 112 that cause the control system 100 to perform one or more of instructions when executed by the one or more processors 110. In at least one embodiment, and as described in greater detail below with respect to a process 200 of FIG. 2, and/or a process 300 of FIG. 3, which may be implemented by a processor 110 of FIG. 1, a method of operating or utilizing a control system 100 may include programming logic such as set forth in at least one of the process 200 and the process 300.

The control system 100 of FIG. 1 includes a smart mobile device 104 paired with the smart vehicle 102. A graphical user interface (GUI) is disposed on and as part of the display screen 107 of the smart mobile device 104 and is communicatively coupled to and controlled by a software application tool 106 configured to monitor and control one or more functionalities of the smart vehicle 102. The smart mobile device 104 may be a smartphone, a tablet, or a like portable handheld smart device. As a non-limiting example, the smart mobile device 104 may be a smartphone such as the iPHONE or a tablet such as the iPAD, both of which are commercially available from Apple, Inc. of Cupertino, Calif. The smart mobile device 104 includes a camera, a processor, a memory communicatively coupled to the processor, and machine readable instructions stored in the memory. The machine readable instructions may cause the configuration system to, when executed by the processor, launch and operate the software application tool 106 on the smart mobile device 104. The machine readable instructions may cause the configuration system to, when executed by the processor, use the functionality provided by the software application tool 106 to follow one or more control schemes as set forth in the one or more processes described herein. In some embodiments, software application tool 106 includes a user interface such as the above mentioned GUI, and further includes a processor, which could take the form of (or include) a processor of smart mobile device 104, another processor, or a combination of these.

Thus, smart mobile device 104 may be configured to be communicatively coupled to the smart vehicle 102. As an example and not a limitation, the machine readable instructions may include instructions to control smart features of the smart vehicle 102 with the smart mobile device 104 paired with the smart vehicle 102. The machine readable instructions may further include instructions to automatically select a wireless routing configuration for the smart mobile device 104 paired with the smart vehicle 102, as described in greater detail below.

Figure 2:
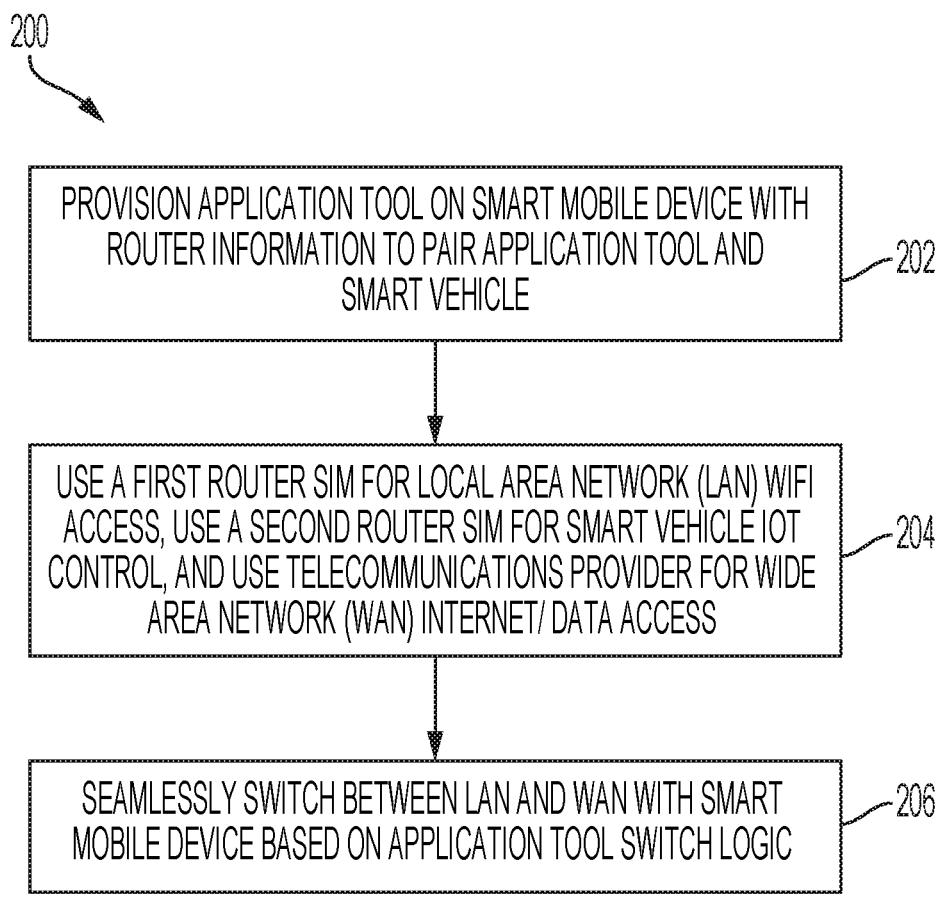
FIG. 2 is a flow chart of a process for using the control system of FIG. 1 to automatically control wireless routing selection with the smart mobile device paired with the smart vehicle, according to one or more embodiments shown and described herein
Figure 3:
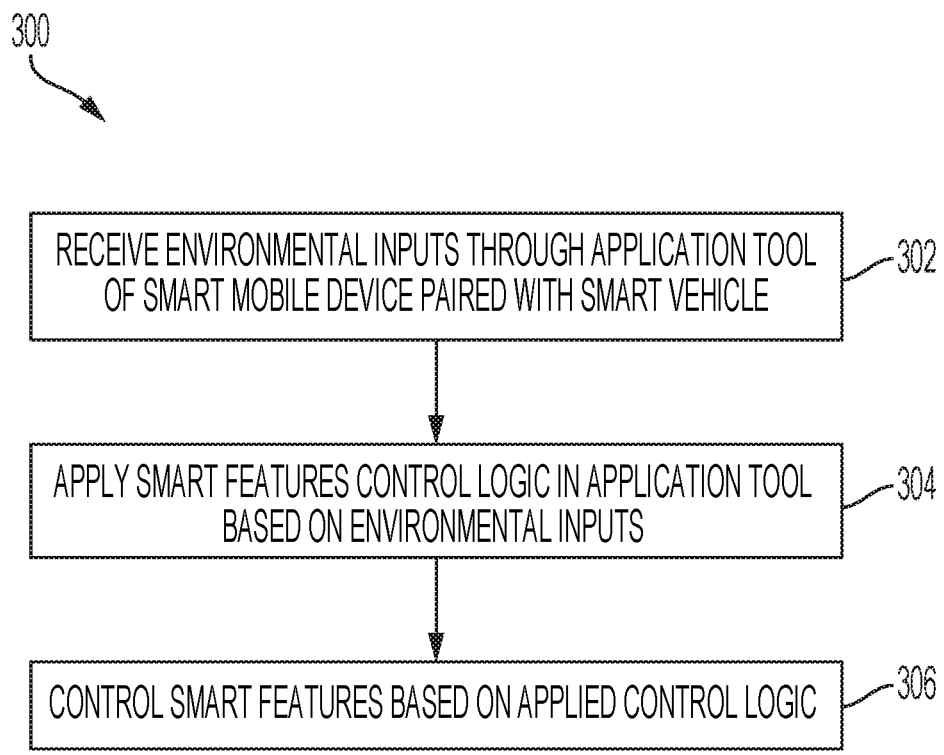
FIG. 3 is a flow chart of a process for using the control system of FIG. 1 to control smart features operation of the smart vehicle through the paired smart mobile device, according to one or more embodiments shown and described herein.

Referring to FIGS. 1-3, a control system 100 for implementing a computer and software-based method to automatically select a wireless routing configuration for the smart mobile device 104 paired with the smart vehicle 102 (FIG. 1) and to control smart features of the smart vehicle 102 with the smart mobile device 104 paired with the smart vehicle 102 (FIG. 1) is illustrated and may be implemented through use of the GUI of the smart mobile device 104, for example. The control system 100 further includes a communication path 103 communicatively coupled to the one or more processors 110, the memory 112, network interface hardware such as the router 116, and an identification component 114. The identification component may be, for example, a unique quick response ("QR") code associated with the smart vehicle 102. For example, the QR code as the identification component 114 is a unique matrix barcode that includes a machine readable optical label containing information about the smart vehicle 102. The system may further include a storage or database, a network 108, and one or more servers 109.

By way of example, and not as a limitation, in a pairing mode, the smart mobile device 104 acts as a central device that may scan for data packets advertised by the smart vehicle 102 as a peripheral device, and an authentication code for pairing may be used to reject and filter out data packets from devices with which the central device is not interested in communicating. For example, a list of peripheral devices within a signal strength range of the central device may be displayed on a discovered devices list. The peripheral device may be selected from the discovered devices list of the central device, and an encrypted, paired connection may be established between the central device and the peripheral device. With use of scanning of the identification component 114 as described herein by the smart mobile device, a peripheral device need not be manually selected from a listing of peripheral devices within a signal strength range but rather may automatically be selected as the smart vehicle 102 associated with the scanned identification component 114 (e.g., the QR code pre-associated with the smart vehicle 102). Detection of no other user accounts being linked to a unique authentication certificate acts as an authenticator to determine whether the smart mobile device 104 requesting pairing with the smart vehicle 102 is permitted to be provided with the unique authentication certificate. Provision of the unique authentication certification to one user account allows for only one user account to be able to be paired with the smart vehicle 102 at a time.

In some embodiments, the control system 100 is implemented using a local area network (LAN) or wide area network (WAN) as the network 108, such as an intranet or the Internet, or other wired or wireless communication network that may include a cloud computing-based network configuration. The LAN may as a local network associated with the smart vehicle 102 provide local wireless access through the router 116 as an access point through a provisioned second identification card 120, as described in greater detail below. The WAN may provide remote wireless access through a card services provider, such as a cellular services provider configured to provide wireless access data usage through a remote cellular network. The control system 100 may be configured to automatically control a wireless routing selection between a local network associated with the smart vehicle and a remote cellular network based on an application tool switch logic, as described in greater detail further below.

As noted above, the control system 100 includes the communication path 103 to communicatively couple the system components. The communication path 103 may be formed from any medium that is capable of transmitting a signal such as, for example, conductive wires, conductive traces, optical waveguides, or the like, or from a combination of mediums capable of transmitting signals. The communication path 103 communicatively couples the various components of the control system 100. As used herein, the term "communicatively coupled" means that coupled components are capable of exchanging data signals with one another such as, for example, electrical signals via conductive medium, electromagnetic signals via air, optical signals via optical waveguides, and the like.

As noted above, the control system 100 includes the one or more processors 110. The one or more processors 110 can be any device capable of executing machine readable instructions. Accordingly, the processor 110 may be a controller, an integrated circuit, a microchip, a computer, or any other computing device. The one or more processors 110 may include an internet of things ("IOT") controller 110A and/or a vehicle controller 110B to control and exchange information regarding one or more vehicle functionalities. In some embodiments, smart vehicle 102 comprises IoT controller 110A and one or more smart vehicle features that are communicatively coupled to the IoT controller 110A. By way of example, and not as a limitation, sensors configured to detect water levels within the smart vehicle 102 may communicate such information to IOT controller 110A and/or a vehicle controller 110B. The identification component 114 may be associated with the smart vehicle 102 such that information regarding the association is sent to the network 108 (e.g., the cloud) through the controller interface and stored in the cloud, including, for example, the vehicle identification number (VIN) of the smart vehicle 102 and information regarding the IOT controller 110A. Smart mobile device 104 (e.g., software application tool 106 of smart mobile device 104) may be paired with IOT controller 110A. The software application tool may use the identification component 114 to pair with the smart vehicle 102 and be provided with access to the associated smart vehicle 102 information stored in the cloud.

The IOT controller 110A, vehicle controller 110B, and identification component 114 are linked and communicatively coupled to connect, interact with, and exchange data between each other. The identification component 114 is thus associated with the router 116 and the router file in the cloud to further provide vehicle specific information about the associated smart vehicle 102 within which the router 116 is installed to the cloud. The identification component 114 may be a unique QR code configured to act as a digital key to identify the associated smart vehicle 102. Thus, associating the identification component 114 with the router 116 sends information such as the unique QR code to the router file in the cloud. Additionally sent information may include the vehicle identification number (VIN) of the smart vehicle 102 and information regarding the IOT controller 110A.

The IOT controller 110A is configured to connect, interact with, and exchange data between the vehicle subsystems through an interface control. By way of example, and not as a limitation, the IOT controller 110A may be a CZone controller as commercially available by Power Products, LLC of Menomonee Falls, Wis. The CZone controller is configured to replace one or more hard wired switch and fuse panels with networked digital switch interfaces to provide control of onboard electrical systems through an intelligent management system. The CZone controller may combine multiple circuits through a mode selection functionality and monitor vehicle systems and components while retaining control over specific circuits and functionality. The CZone controller is configured to provide the user with an interface able to provide such monitoring and control functionality, such as for power management automation.

Further, the vehicle controller 110B is configured to connect, interact with, and exchange data between various vehicle subsystems. The vehicle controller 110B may be a vehicle control area network bus ("CAN bus") controller. The CAN bus controller incorporates a robust vehicle bus standard to allow microcontrollers and vehicle devices to communicate within the vehicle systems without a host computer. The CAN bus controller incorporates a message-based protocol that cooperates with multiplex electrical wiring within the smart vehicle 102. Further, the CAN bus controller is configured to permit interaction between various vehicle systems to allow for a wide range of functionality and control through use of software rather than hard wiring between such systems. By way of example, and not as a limitation, a vehicle subsystem may control actuators or receive feedback from sensors through the CAN bus controller to control a vehicle functionality. The CAN bus is configured to collate various sensor inputs from one or more different vehicle subsystems as needed to determine whether to enact a vehicle functionality of the vehicle subsystem based on those sensor inputs.

The one or more processors 110 are communicatively coupled to the other components of the control system 100 by the communication path 103. Accordingly, the communication path 103 may communicatively couple any number of processors with one another, and allow the modules coupled to the communication path 103 to operate in a distributed computing environment. Specifically, each of the modules can operate as a node that may send and/or receive data. The one or more processors 110 may process the input signals received from the system modules and/or extract information from such signals.

As noted above, the control system 100 includes the memory 112 which is coupled to the communication path 103 and communicatively coupled to the one or more processors 110. The memory 112 may be a non-transitory computer readable medium or non-transitory computer readable memory and may be configured as a nonvolatile computer readable medium. The memory 112 may comprise RAM, ROM, flash memories, hard drives, or any device capable of storing machine readable instructions such that the machine readable instructions can be accessed and executed by the one or more processors 110. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory 112. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In embodiments, the control system 100 may include the one or more processors 110 communicatively coupled to the memory 112 that stores instructions that, when executed by the one or more processors 110, cause the processor to perform one or more functions as described herein.

Still referring to FIG. 1, as noted above, the control system 100 comprises a smart mobile device 104 that includes a display screen 107 configured to display a GUI of a smart vehicle software application tool 106 accessible by the smart mobile device 104 for providing visual output such as, for example, information, graphical reports, messages, or a combination thereof. The smart mobile devices may include smartphones, tablets, laptops, and/or the like. After pairing, the communication path 103 communicatively couples the smart vehicle software application tool 106 to other modules of the control system 100. The display screen 107 can include any medium capable of transmitting an optical output such as, for example, a cathode ray tube, light emitting diodes, a liquid crystal display, a plasma display, or the like.

The control system 100 includes the network interface hardware for communicatively coupling the control system 100 with a computer, cloud, and/or cellular network such as network 108. The network interface hardware may include, for example, the router 116 coupled to the communication path 103 and other modules of the control system 100. The network interface hardware can be any device capable of transmitting and/or receiving data via a wireless network. Accordingly, the network interface hardware can include a communication transceiver for sending and/or receiving data according to any wireless communication standard. For example, the network interface hardware can include a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

The network 108 can include any wired and/or wireless network such as, for example, local area networks, wide area networks, metropolitan area networks, the Internet, an Intranet, the cloud, satellite networks, or the like. Accordingly, the network 108 can be utilized as a wireless access point by the smart vehicle 102 and/or smart mobile device 104 to access one or more servers 109. The one or more servers 109 may include a cloud server and generally include processors, memory, and chipset for delivering resources via the network 108. Resources can include providing, for example, processing, storage, software, and information from the one or more server 109 to the control system 100 via the network 108. Additionally, it is noted that the one or more servers 109 can share resources with one another over the network 108 such as, for example, via the wired portion of the network, the wireless portion of the network, or combinations thereof.

Still referring to FIG. 1, data from various applications running on the one or more processors 110 can be provided from the smart vehicle 102 to the control system 100 via the router 116. The smart vehicle 102 may include or be coupled to one or more computers communicatively coupled with the one or more processors 110, which computers can be any device having hardware (e.g., chipsets, processors, memory, etc.) for communicatively coupling with the router 116 and the network 108. Specifically, the computers can include an input device having an antenna for communicating over one or more of the wireless computer networks described above. Such a computer may include the smart mobile device 104 after pairing with the router 116 as described herein.

The router 116 includes a first identification card 118 and a second identification card 120. The first and second identification cards 118, 120 may be a pair of subscriber identity module (SIM) cards, or SIMS, each of which is an integrated circuit that securely stores an international mobile subscriber identity (IMSI) number and related key information used to identify and authenticate subscribers of smart mobile telephone devices. Each SIM card may also store contact information. Each SIM card may also store its own unique serial number as an integrated circuit card identifier (ICCID), the IMSI number, security authentication and ciphering information, local network related temporary information, a list of accessible user services, a user password as a personal identification number (PIN), and a personal unblocking code to unlock the PIN. A card services provider may be able to identify and authenticate a SIM card to provide services, such as cellular and/or wireless data services to a device within which the SIM card is installed.

The first identification card 118 is configured for operation with IOT control of the vehicle, such as for association with the IOT controller 110A to provide technology information and/or telemetry information to, for example, the cloud for a card services provider and/or permitted users of the first identification card 118. By way of example, and not as a limitation, such telemetry information includes vehicle data of the smart vehicle 102 that is sent to the cloud for monitoring and/or tracking purposes with respect to the smart vehicle 102. For example, submission of such data from a variety of smart vehicles 102 may permit monitoring and/or tracking of vehicle information across a fleet of vehicles and an associated ease and efficiency of fleet management. The second identification card 120 is configured to operate as an authenticated access point to provide wireless data services from the card services provider.

Automatic Wireless Routing Selection

Referring to FIG. 2, the control system 100 is configured for automatic wireless routing selection for the smart mobile device 104 paired with the smart vehicle 102 through the process 200. In block 202, the software application tool 106 is provisioned on the smart mobile device 104 with router information from the router 116 uploaded to cloud to pair the software application tool 106 and the smart vehicle 102 within which the router 116 is installed.

In block 204, the second identification card 120 is configured as a first router identification (e.g., a SIM card) for local area network (LAN) wireless fidelity (wifi) access for local access. The first identification card 118 is configured as a second router identification (e.g., a SIM card) for IOT control through the IOT controller 110A of the smart vehicle 102. Further, a card services provider, such as a telecommunications provider, is configured to be utilized by the smart mobile device 104 for remote, wide area network (WAN) internet/data access for remote access. The first router SIM card for LAN wifi access is configured to provide data to a local hardwired network of the vehicle. It is to be understand that the router 116 without one or more SIMS is configured for control of and access to the local hardwired network of the vehicle, such as through a network interface connection plugged into the router 116.

By way of example, and not as a limitation, such LAN networks typically have higher bandwidth rates than WAN networks. Further, WAN connectivity is often dependent on connectivity solutions provided by Internet Service Providers. The control system 100 uses a LAN through the router 116 set up as a wireless access point to provide wifi as local wireless access through the second identification card 120. The control system 100 further uses a WAN through a cellular provider access set up with the smart mobile device 104 to access the cloud (e.g., the network 108) as remote wireless access.

In block 206, based on application tool switch logic from the software application tool 106, the control system 100 is configured to seamlessly switch between LAN and WAN networks with the smart mobile device 104. By way of example, and not as a limitation, the application tool switch logic is configured to determine an optimal path, as either a LAN or WAN selection, for functionalities such as smart mobile device control, diagnostics, smart vehicle monitoring, and/or telemetry such as sending information from and about the smart vehicle 102 to the cloud. The application tool switch logic is configured to determine the optimal path at least partially based on connectivity qualities with respect to the LAN or WAN, distance between the smart vehicle 102 and the smart mobile device 104, data usage, and/or required parameter functionality. By way of example, and not as a limitation, the application tool switch logic is configured to determine the optimal path at least partially based on whether the connectivity of the LAN or the WAN is degraded or nonexistent to automatically switch to the other of the LAN or the WAN having a better connectivity quality. In an embodiment, the LAN performance metric is a LAN connectivity level of the wireless LAN connection, the WAN performance metric is a WAN connectivity level of the wireless WAN connection, and the LAN connectivity level or the WAN connectivity level that has a higher level is indicative of a better connectivity quality such that the higher level is associated with the optimal network connection. The software application tool 106 is configured to ping the router 116 to consistently check the communication between the router 116 of the smart vehicle 102 and the smart mobile device 104. In a non-limiting example, the LAN performance metric is a LAN ping signal level associated with a ping of router 116 via the wireless LAN connection, and the WAN performance metric is a WAN ping level associated with a ping of router 116 via the wireless WAN connection. The LAN ping signal level or the WAN ping signal level that has a higher level is indicative of a better ping signal quality of signal strength such that the higher level is associated with the optimal network connection. Additionally or alternatively, the application tool switch logic is configured to determine the optimal path at least partially based on an amount of data being used. In an embodiment, when a high amount of data is being used or expected to be used, the application tool switch logic is configured to switch from the WAN, if currently selected, to the LAN that has a higher bandwidth suitable for such data usage.

In an embodiment, at a first time, network interface hardware of control system 100 is configured to facilitate communication between the smart mobile device 104 and the smart vehicle 102 over a network connection, the network connection comprising one of the wireless LAN connection and the wireless WAN connection. A LAN performance metric of the wireless LAN connection is determined, and a WAN performance metric of the wireless WAN connection is determined. To determine which of the wireless LAN connection or the wireless WAN connection comprises an optimal network connection at a second time (e.g., subsequent to a first time), the LAN performance metric and the WAN performance metric are compared. The network connection is automatically switched to the optimal network connection based on the application tool switch logic when the network connection is one of the wireless LAN connection and the wireless WAN connection and the optimal network connection is the other of the wireless LAN connection and the wireless WAN connection. Comparing the LAN performance metric and the WAN performance metric may include identifying which of the LAN connectivity level or the WAN connectivity level is a higher level indicative of a better connectivity quality such that the higher level is associated with the optimal network connection. In some embodiments, determining which of the wireless LAN connection or the wireless WAN connection comprises an optimal network connection includes determining a data usage determination indicative of whether a high amount of data is being used or expected to be used, and determining which of the wireless LAN connection or the wireless WAN connection comprises the optimal network connection at least partially based on the data usage determination.

The application tool switch logic of the software application tool 106 when the smart mobile device 104 is paired with the smart vehicle 102 is further configured for viewing and control of IOT controller 110A functionalities to the control the IOT of the smart vehicle 102. Further, the application tool switch logic is configured to determine the optimal path at least partially based on required parameter functionality to control the IOT controller 110A, such as light-of-sight (LOS) requirements. By way of example, and not as a limitation, a LOS requirement for control of a smart feature of the smart vehicle 102, as described in greater detail below, may disable automatic selection of WAN. As a further example, settings of the router 116 may only be changeable when a selection of LAN is in place. In an embodiment, determining which of the wireless LAN connection or the wireless WAN connection is an optimal network connection includes determining a line-of-sight (LOS) determination indicative of whether the smart vehicle feature is within a LOS of a user of the smart mobile device 104 to satisfy a LOS requirement. In such an embodiment, the wireless LAN connection may be determined as comprising the optimal network connection when the LOS determination satisfies the LOS requirement.

In some embodiments, operation of at least one smart vehicle feature of the smart vehicle 102 may be controlled based at least in part on the optimal network connection. For instance, environmental inputs with respect to the smart vehicle 102 may be generated by the IOT controller 110A and received by the software application tool 106. Control logic may be applied based on the environmental inputs and the at least one smart vehicle feature, and operation of the at least one smart vehicle feature may be controlled based on the applied control logic, the environmental inputs, and the optimal network connection. Additional details of such aspects are provided below.

The control system 100 is additionally configured to apply the application tool switch logic while syncing a message queuing telemetry transport ("MQTT") code as a messaging protocol from a local MQTT server to a cloud MQTT server for optimal performance when automatically selecting between LAN and WAN. As a non-limiting example, MQTT is a protocol for transmission from local software to the cloud and is able to be used for telemetry purposes to transmit information about the local smart vehicle 102 to the remote cloud (e.g., the network 108).

In embodiments, the smart vehicle 102 may be in a remote location with no cellular access through the WAN. However, the control system 100 may still utilize the smart mobile device 104 to control the smart vehicle 102 through the LAN access from the router 116 even if the smart mobile device 104 is remotely distanced from the smart vehicle 102. For example, a unique digital certification provided to the smart mobile device 104 through pairing with the smart vehicle 102 is configured to allow authorization of local IOT control between the smart mobile device 104 and the IOT controller 110A of the smart vehicle 102 through the first identification card 118 of the router 116.

Alternatively, the smart vehicle 102 may be in a remote location with cellular access through the WAN, in which case the control system 100 may still utilize the smart mobile device 104 to control the smart vehicle 102 through the WAN access based on a determination by the application tool switch logic that WAN access is more optimized in the remote location than LAN access. In another embodiment, the smart vehicle 102 may be closely distanced to the smart mobile device 104 yet not have cellular access through the WAN, in which case the control system 100 may still utilize the smart mobile device 104 to control the smart vehicle 102 through the LAN access. Alternatively, the smart vehicle 102 may be closely distanced to the smart mobile device 104 and have cellular access through the WAN, in which case the control system 100 may still utilize the smart mobile device 104 to control the smart vehicle 102 through the LAN access or the WAN access based on the application tool switch logic determination of the optimal path as either the LAN or WAN.

Smart Feature Operational Control

Referring to FIG. 3, a process 300 depicts use of logic to control operation of smart features of the smart vehicle 102 with the smart mobile device 104 through the paired connection between the smart mobile device 104 and the smart vehicle 102. Reference to FIGS. 4-7 will be made along with associated blocks of the process 300 to describe the smart feature control between the smart mobile device 104 and the smart vehicle 102.

In block 302 of the process 300 of FIG. 3, one or more environmental inputs are received through the software application tool 106 of the smart mobile device 104 paired with the smart vehicle 102. By way of example, and not as a limitation, the one or more environmental inputs may include information regarding solar load with respect to the smart vehicle 102, temperature information, information regarding the engine status of the smart vehicle 102, and/or information regarding power from a tow vehicle associated with the smart vehicle 102. The received one or more environmental inputs may thus be information regarding power consumption, power connectivity, solar power performance, brake status, and/or weather conditions. The environmental inputs with respect to smart vehicle 102 may be generated by the IOT controller 110A and received by the software application tool 106.

In block 203, a control logic for smart features control is applied based on the received one or more environmental inputs. For example, a control logic may be applied based on the environmental inputs and on one or more smart vehicle features of smart vehicle 102. The one or more smart features may include, for example, a smart awning and/or or more vent fans of the smart vehicle 102. By way of example, and not as a limitation, the received one or more environmental inputs may be used to restrict and/or control smart features through the applied control logic.

In block 306, the smart features are controlled through the smart mobile device 104 paired with the smart vehicle 102 based on the applied control logic. As an example, operation of at least one smart vehicle feature of one or more smart vehicle features (via a user interface of the software application tool 106) may be controlled based on the applied control logic and the environmental inputs. Such control could include opening, closing, shutting off, turning on, locking, and/or restriction of control of at least one smart feature, as described below. For instance, the control could include restricting operation, via the user interface, of at least one smart vehicle feature. The software application tool 106 may further be configured to use the applied control logic based on the received one or more environmental inputs to generate alerts indicating general and/or critical conditions (e.g., a risk of bad weather or low power availability).

In an embodiment, the environmental inputs include information regarding power consumption as sensed by IoT controller 110A, and the control logic includes logic to determine whether the power consumption as sensed by the IoT controller 110A exceeds a threshold power consumption. For instance, when the one or more environmental inputs is power, the logic may be programmed to determine if 12V or more of power is sensed by the smart vehicle 102. In such an embodiment, control of at least one smart vehicle feature of the smart vehicle 102 may include restricting operation of the at least one smart vehicle feature when the power consumption as sensed by the IoT controller 110A exceeds the threshold power consumption. As an example, if the logic determines that at least 12V of power is sensed by the smart vehicle 102, the logic may be programmed to lock control through the smart mobile device 104 of a smart feature such as an awning 160 of the smart vehicle.

In another embodiment, the environmental inputs include a brake status of a vehicle brake of smart vehicle 102 as sensed by the IoT controller 110A, and the control logic includes logic to determine whether the brake status is indicative of activation of the vehicle brake. In such an embodiment, control of at least one smart vehicle feature of the smart vehicle 102 may include restricting operation of the at least one smart vehicle feature when the brake status is indicative of activation of the vehicle brake. For instance, when a user presses a brake on the smart vehicle 102 as sensed through the IoT controller and/or the vehicle controller 110B, the awning 160 may lock. Thus, when the smart vehicle 102 is sensed to be in drive mode, a user may be restricted by the applied control logic from opening or closing the awning 160 with the smart mobile device 104.

In a further embodiment, the environmental inputs include information regarding weather conditions as sensed by a sensor communicatively coupled to IoT controller 110A, and the control logic includes logic to determine whether the weather conditions are indicative of a risk of bad weather. For instance, the control logic may permit opening/closing of the smart features based on the weather as an environment input or a risk of bad weather as determined from the received environmental input. In such an embodiment, control of at least one smart vehicle feature of the smart vehicle 102 may include restricting operation of the at least one smart vehicle feature when the weather conditions are indicative of a risk of bad weather. As an example, if a risk of bad weather indicates high winds and/or rain, the control logic may be programmed to lock control through the smart mobile device 104 of a smart feature such as an awning 160 of the smart vehicle such that the control of the awning 160 by the smart mobile device 104 is restricted. As another non-limiting example, smart features such as one or more vent fans of the smart vehicle 102 may be programmed through the control logic to shut off based on a low outside temperature received as the environmental input.

Figure 4:
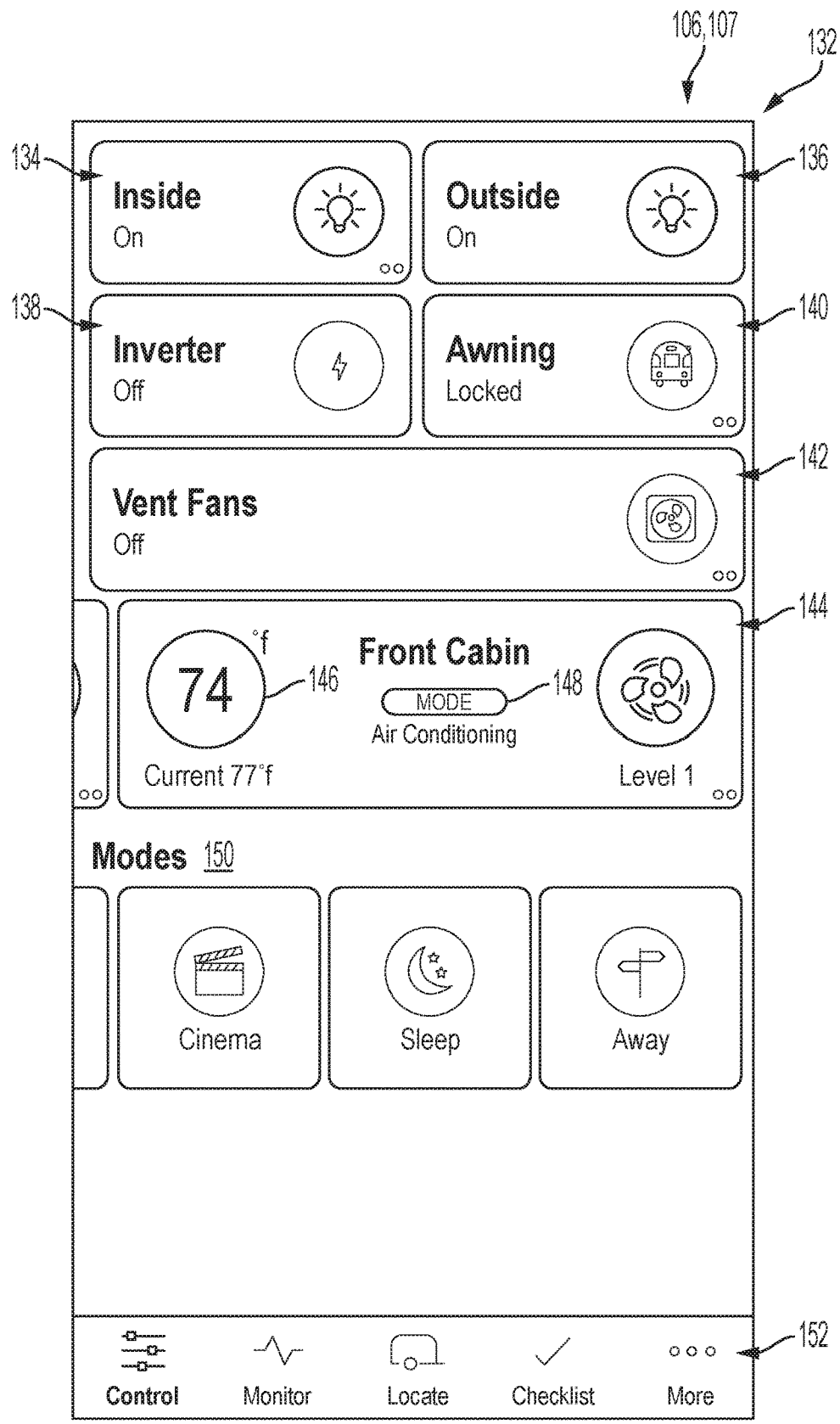
FIG. 4 is a screenshot view on a graphical user interface (GUI) of a smart vehicle software application tool of the smart mobile device paired with the smart vehicle and showing a control screen on the smart mobile device configured to control one or more smart vehicle functionalities, according to one or more embodiments shown and described herein.

As a non-limiting example, FIG. 4 depicts a control screen 132 of the software application tool 106 on the display screen 107 of smart mobile device 104 after pairing with the smart vehicle 102. The control screen 132 is configured to control one or more smart vehicle functionalities. The control screen 132 is accessed from the software application tool 106 through selection of a Control icon from an options banner 152 at the bottom of the GUI of the software application tool 106 displayed on the display screen 107 of the smart mobile device 104. Other icons in the options banner 152 include a Monitor icon to monitor the status of various vehicle subsystems, a Locate icon to connect the vehicle with external Global Positioning System (GPS) map data to locate the vehicle with respect to such map data, a Checklist icon to provide checklist information associated with the smart vehicle 102, and a More icon for additional icon selections. With respect to the control screen 132, the control screen 132 is configured to control various vehicle functionalities through the IOT controller 110A and/or vehicle controller 110B.

The control screen 132 may include one or more buttons, and each of the buttons may be configured to control a respective smart vehicle feature. By way of example, and not as a limitation, an Inside button 134 is configured to control the lighting inside the smart vehicle 102, such as turning the lighting on or off or dimming the lighting in different portions of the smart vehicle 102. An Outside button 136 is configured to similarly control the lighting attached outside the smart vehicle 102. An Inverter button 138 is configured to control power associated with running the smart vehicle 102, such as controlling conversion between direct current (DC) and alternating current (AC) for various vehicle subsystems. An Awning button 140 is configured to control whether an awning of the smart vehicle 102 is opened, closed, and/or locked. A Vent Fans button 142 is configured to control whether one or more vent fans of the smart vehicle 102 are on or off (e.g., opened or closed). A Front Cabin button 144 includes additional sub-controls for the front cabin of the smart vehicle 102, such as temperature control through a temperature button 146, HVAC mode selection through a mode button 148 (e.g., showing an air condition (AC) mode selection in FIG. 9), and a level of one or more vent fans in the front cabin. Similar buttons may be scrolled to include similar options for other portions of the smart vehicle 102, such as a rear cabin. A Modes 150 section includes additional icons such as for a Cinema control mode to control audiovisual systems of the smart vehicle 102, Sleep control mode to control nighttime settings in the smart vehicle 102, for example, and an Away mode to control away settings for the smart vehicle 102 when the user may be away from the smart vehicle.

Figure 5:
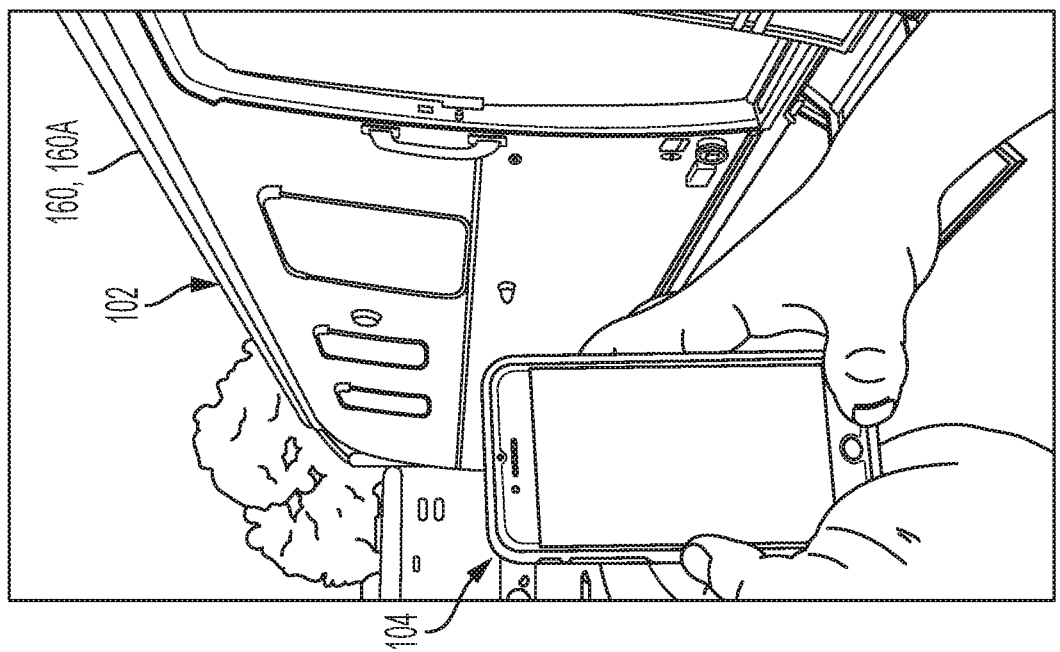
FIG. 5 is a view of use of the smart vehicle software application tool of FIG. 4 to control operation of a smart awning of the smart vehicle with the smart awning in a closed position, according to one or more embodiments shown and described herein.
Figure 6:
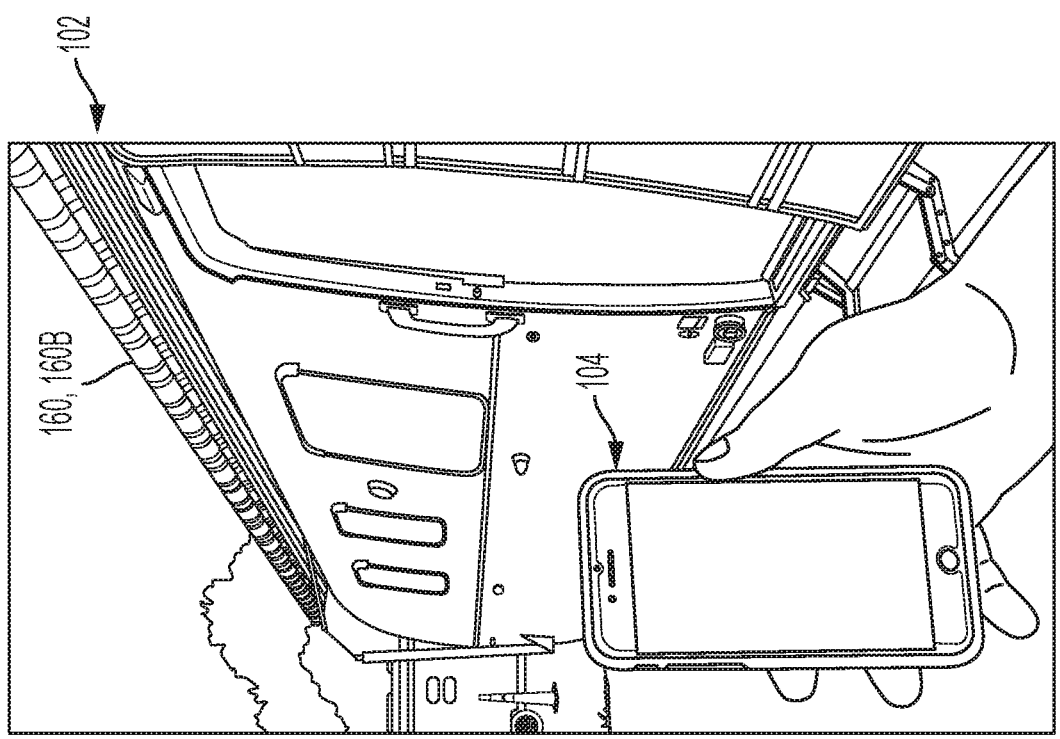
FIG. 6 is a view of use of the smart vehicle software application tool of FIG. 4 to control operation of a smart awning of the smart vehicle with the smart awning in an intermediate position, according to one or more embodiments shown and described herein.
Figure 7:
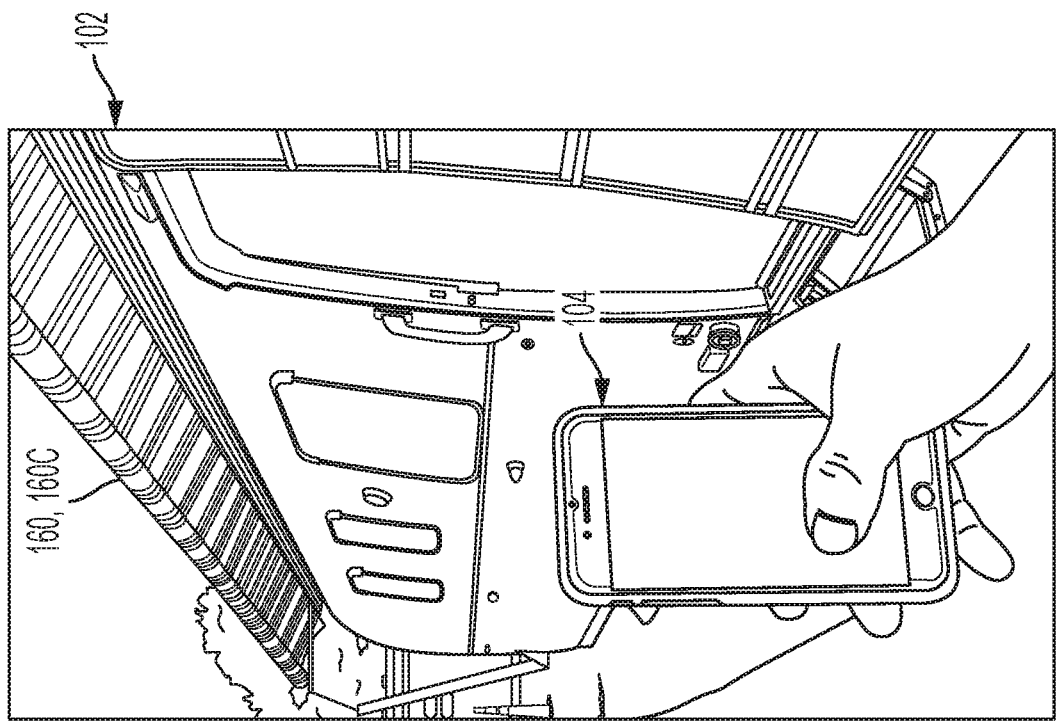
FIG. 7 is a view of use of the smart vehicle software application tool of FIG. 4 to control operation of a smart awning of the smart vehicle with the smart awning in an opened position, according to one or more embodiments shown and described herein.

As described above, the Awning button 140 of FIG. 4 is configured to control whether the awning 160 of the smart vehicle 102 is opened, closed, and/or locked. Such control through the smart mobile device 104 of the awning 160 of the smart vehicle 102 is shown in FIGS. 5-7. FIG. 5 depicts use of the software application tool 106 of the smart mobile device 104 to control operation of the awning 160 of the smart vehicle 102 through the Awning button 140 to place the awning 160 in a closed position 160A. FIG. 6 depicts use of the software application tool 106 of the smart mobile device 104 to control operation of the awning 160 of the smart vehicle 102 through the Awning button 140 to place the awning 160 in an intermediate position 160B between the closed position 160A and an open position 160C (FIG. 7). FIG. 7 depicts use of the software application tool 106 of the smart mobile device 104 to control operation of the awning 160 of the smart vehicle 102 through the Awning button 140 to place the awning 160 in the open position 160C. The software application tool 106 may be configured to communicate with the IOT controller 110A to use the one or more received environmental inputs for digital, dynamic process control rather than simply binary processes such as opening and closing. For example, dynamic motion information may assist with awning motion information rather than simply awning state information.

In an embodiment, the above described control logic includes logic to determine, as a line-of-sight (LOS) determination, whether at least one smart vehicle feature of the one or more smart vehicle features is within a LOS of a user of the smart mobile device 104. The control logic is applied based on the environmental inputs, the one or more smart vehicle features, and the LOS determination. In such an embodiment, control of the at least one smart vehicle feature may include restricting operation of the at least one smart vehicle feature when the LOS determination is indicative that the at least one smart vehicle feature is not within the LOS of the user of the smart mobile device 104. For instance, the applied control logic of the software application tool 106 may be configured to restrict control of the awning 160 through the smart mobile device 104 when, for example, the awning 160 is not within a LOS of a user of the smart mobile device 104. This may be automatically determined to be when the smart vehicle 102 is in operation based on the received one or more environmental inputs. Alternatively, use of WAN may be an indicator of a risk that the awning 160 is not within the LOS of the user of the smart mobile device 104 such that the software application tool 106 is restricted from operating the awning 160 when WAN is selected instead of LAN. Such a LOS requirement prevents opening of the awning 160 when the smart vehicle 102 is in motion and/or when an obstacle may be in the pathway of the awning 160 when opening and unknown to user that is unable to view the awning 160 when the awning 160 is not within a LOS of the user. Thus, damage of the awning 160 and/or the obstacle is prevented through such a LOS requirement to restrict automated control of the awning 160.

In some embodiments, operation of the at least one smart vehicle feature may be controlled based on the applied control logic, the environmental inputs, and a network connection. As an example, network interface hardware of control system 100 may be configured to facilitate communication between the smart mobile device 104 and the smart vehicle 102 over a network connection, the network connection comprising one of the LAN connection and a wireless wide area network (WAN) connection (e.g., as described above). In such an example, control of at least one smart vehicle feature of the smart vehicle 102 may include restricting operation of the at least one smart vehicle feature when the network connection comprises the WAN connection.

As further described above, the Vent Fans button 142 of FIG. 4 is configured to control whether one or more vent fans of the smart vehicle 102 are on or off (e.g., opened or closed). The one or more vent fans of the smart vehicle 102 are configured for use to exhaust gas out of the smart vehicle 102, for example. The one or more vent fans of the smart vehicle 102 may further provide cooling in the trailer. For example, when air conditioning is not running in the smart vehicle 102, the one or more vent fans of the smart vehicle 102 may provide cooling. Additionally or alternatively, when a vent is open, air/smoke from cooking, for example, is released from the smart vehicle 102.

The methodologies described herein that occur when the smart vehicle 102 is paired with a user account of the software application tool 106 of the smart mobile device 104 involve operation of smart features of the smart vehicle 102 through the software application tool 106 and a seamless switch between LAN and WAN routing through the software application tool 106 of the smart mobile device 104 when paired with the smart vehicle 102. With respect to operation of the smart features of the smart vehicle 102, the software application tool 106 is configured to communicate with one or more controllers of the smart vehicle 102 to open and close smart vehicle features such as an awning and/or one or more vent fans of the smart vehicle as described herein. The controller may be the IOT controller 110A configured to provide dynamic information regarding smart feature motion such as awning motion rather than state of the awning (e.g., open/closed or locked/unlocked) information alone. Logic is applied from received environmental inputs as described herein to control the smart vehicle features, which inputs may include solar load, temperature, engine status, and power. The smart vehicle features may be configured to be turned on and off based on power consumption, connectivity to power, and solar power performance. Additionally, LOS requirements may be incorporated for operation of smart vehicle features, such that such smart feature operation is not permitted to occur unless there is an indication that the smart feature is within LOS of the smart mobile device 104 (and thus a user of the smart mobile device 104). Further, LOS requirements may be incorporated for the logic to automatically determine the wireless routing selection to switch between the LAN and WAN based on connectivity status and parameters as described herein.

Such an automated data control system streamlines and more accurately and effectively adapts digital or data management solutions from a data manager such as the software application tool 106 to the smart vehicle 102 on demand while minimizing dependencies on user involvement and know-how. The user may further utilize the smart mobile device 104 to monitor and control activity of the smart vehicle 102 as described herein.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A control system, the control system comprising:
a smart vehicle, the smart vehicle comprising an Internet of Things (IoT) controller and one or more smart vehicle features communicatively coupled to the IoT controller;
a smart mobile device comprising a software application tool, the smart mobile device including a user interface and comprising a processor, the software application tool paired with the IoT controller; and
a non-transitory computer readable storage communicatively coupled to the processor, the non-transitory computer readable storage comprising instructions that, when executed by the processor, cause the control system to
generate, by the IoT controller, environmental inputs with respect to the smart vehicle,
receive, by the software application tool, the environmental inputs with respect to the smart vehicle,
apply control logic based on the environmental inputs and the one or more smart vehicle features, and
control operation via the user interface of the software application tool of at least one smart vehicle feature of the one or more smart vehicle features based on the applied control logic and the environmental inputs;
wherein the control logic comprises logic to
determine as a line-of-sight (LOS) determination whether the at least one smart vehicle feature is within a LOS of a user of the smart mobile device, and
apply the control logic based on the environmental inputs, the one or more smart vehicle features, and the LOS determination; and
the instructions to control operation of the at least one smart vehicle feature comprise instructions to restrict operation of the at least one smart vehicle feature when the LOS determination is indicative that the at least one smart vehicle feature is not within the LOS of the user of the smart mobile device.

2. The control system of claim 1, wherein the one or more smart vehicle features comprise a smart awning, one or more vent fans, or combinations thereof.

3. The control system of claim 1, wherein the instructions to control operation comprises opening, closing, shutting off, turning on, or locking of the at least one smart vehicle feature.

4. The control system of claim 1, wherein the instructions to control operation of the at least one smart vehicle feature comprise instructions to restrict operation via the user interface of the at least one smart vehicle feature.

5. The control system of claim 1, wherein the instructions to control operation of the at least one smart vehicle feature via the user interface comprise instructions to control operation via a control screen on the user interface, the control screen comprising one or more buttons each configured to control a respective smart vehicle feature of the one or more smart vehicle features.

6. The control system of claim 1, wherein the environmental inputs comprise information regarding power consumption, power connectivity, solar power performance, brake status, weather conditions, or combinations thereof.

7. The control system of claim 1, wherein:
the environmental inputs comprise information regarding power consumption as sensed by the IoT controller of the smart vehicle;
the control logic comprises logic to determine whether the power consumption as sensed by the IoT controller of the smart vehicle exceeds a threshold power consumption; and
the instructions to control operation of the at least one of the one or more smart vehicle features comprise instructions to restrict operation of the at least one smart vehicle feature when the power consumption as sensed by the IoT controller of the smart vehicle exceeds the threshold power consumption.

8. The control system of claim 1, wherein:

the environmental inputs comprise a brake status of a vehicle brake of the smart vehicle as sensed by the IoT controller of the smart vehicle;

the control logic comprises logic to determine whether the brake status is indicative of activation of the vehicle brake; and the instructions to control operation of the at least one smart vehicle feature comprise instructions to restrict operation of the at least one smart vehicle feature when the brake status is indicative of activation of the vehicle brake.

9. The control system of claim 1, wherein:

the environmental inputs comprise information regarding weather conditions as sensed by a sensor communicatively coupled to the IoT controller of the smart vehicle;

the control logic comprises logic to determine whether the weather conditions are indicative of a risk of bad weather; and the instructions to control operation of the at least one smart vehicle feature comprise instructions to restrict operation of the at least one smart vehicle feature when the weather conditions are indicative of a risk of bad weather.

10. The control system of claim 1, wherein:

the smart vehicle further comprises a router, the router comprising a first router identification configured to provide wireless access as a wireless local area network (LAN) connection and a second router identification communicatively coupled with the IoT controller;

the control system further comprises network interface hardware configured to facilitate communication between the smart mobile device and the smart vehicle over a network connection, wherein the network connection comprises one of the wireless LAN connection and a wireless wide area network (WAN) connection; and the instructions to control operation of the at least one smart vehicle feature comprise instructions to restrict operation of the at least one smart vehicle feature when the LOS determination is that the network connection comprises the wireless WAN connection.

* * * * *